May 26, 1953     M. RICKETTSON     2,639,521
HANDLE MEMBER
Filed Feb. 23, 1951
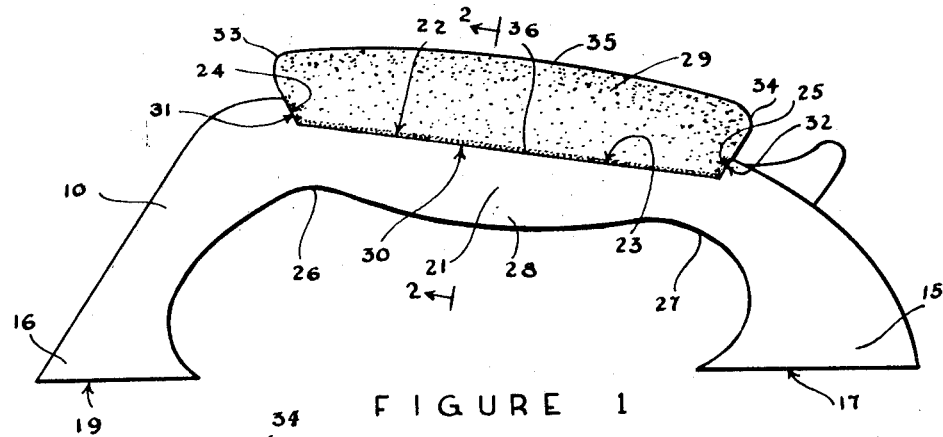
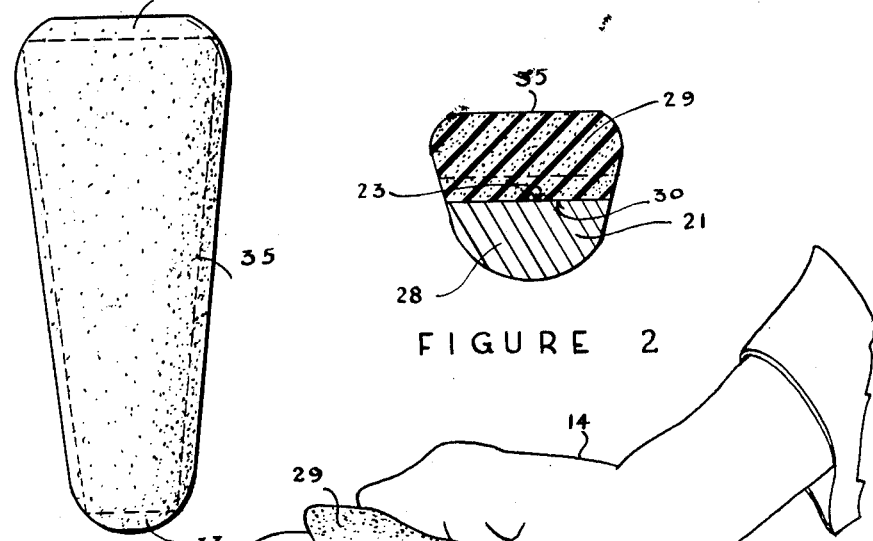
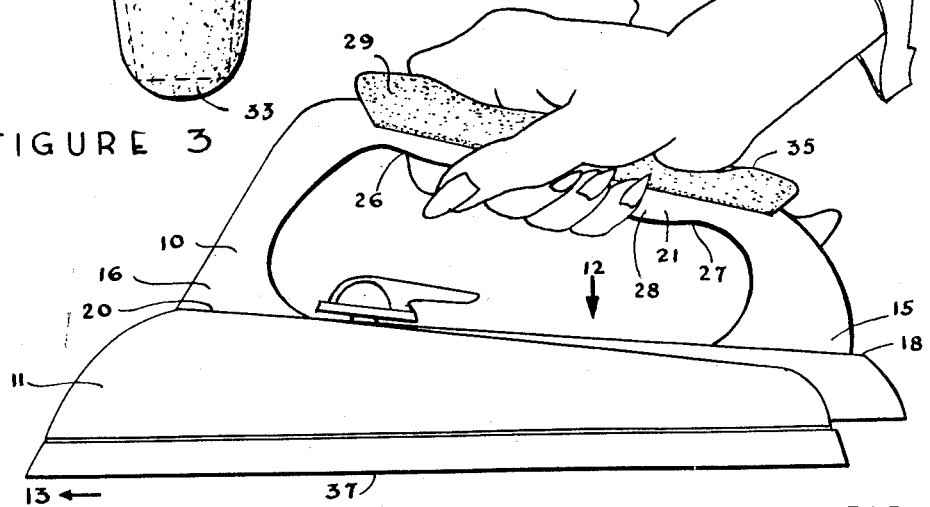
INVENTOR
MARGARET RICKETTSON
BY Morris Michael Marks
ATTORNEY Patented May 26, 1953

2,639,521

UNITED STATES PATENT OFFICE 2,639,521

HANDLE MEMBER

Margaret Rickettson, Clementon, N. J.

Application February 23, 1951, Serial No. 212,346

7 Claims. (Cl. 38—90)

My invention relates to handle members, and it relates more particularly to handles used to impart pressure and controlled direction to movement. Such handles for instance, may be found in electric irons.

Where pressure is required to be imparted in a device such as an electric iron, difficulty is experienced by the hand which grasps the handle for imparting such pressure. Not only do the hand muscles get tired, but calluses form on the hand, and the operation becomes a most unpleasant one. In the case of the housewife who must use an electric iron, this operation often becomes onerous. Attempts have been made to relieve this situation by placing a resilient pad on the handle. Such pads have been made of cork or sponge rubber. In the case of cork, the yieldability of the material is not sufficiently great to relieve the pressure on localized parts of the hand. Thus, calluses are still formed on hands which use a cork-padded handle. In the case of sponge rubber, the yieldability is adequate, but the resilient nature of the material is such as to tend to transform the vertical, pressure-imparting forces and the longitudinal, movement-imparting forces, to longitudinal stresses along the juncture between the pad and the base on which it is mounted, in such a way as to destroy the juncture; and as a result, sponge rubber-padded handles hitherto constructed have proven unsatisfactory in that the pads would be torn from their mountings after a very short use of the handle. Also, sponge rubber padded handles hitherto constructed, have required greater stresses to be imparted to them by the hand, than would be required to operate a rigid handle of conventional construction.

An object of my invention therefore is to provide a handle member having a sponge rubber or similar pad, which will be secure upon its mounting regardless of the length of time, or extent of pressure, involved in the use of the handle.

Another object of my invention is to provide a handle member for a device requiring pressure and controlled movement, said handle member being of such construction as properly to distribute pressure forces transmitted by the hand, while dissipating and reducing to a minimum the stresses on said hand, and yet providing rigid movement-control devices for permitting selected portions of said hand to control the movement of said handle simultaneously with the impartation of pressure thereto.

A further object of my invention is to provide a handle member having a pad of sponge rubber or similar material, which is easy and inexpensive to assemble, and which will be secure and dependable in use.

With the above and other objects in view, my invention consists of the parts, combinations and arrangements of parts hereinafter more fully described.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangements and organizations of the instrumentalities as herein shown and described.

Referring to the drawings in which like reference characters indicate like parts:

Figure 1 represents an elevational view of a handle member embodying my invention.

Figure 2 represents a sectional view taken generally along the lines 2—2 of Figure 1.

Figure 3 represents a substantially plan view of a yieldable pad of a handle member embodying my invention.

Figure 4 represents an elevational view of an electric iron comprising a handle member in use, and embodying my invention.

According to my invention, I provide a handle member 10 which may be made of any suitable material, such for instance as hard rubber, plastic, or otherwise, and of any desired construction, for use on a pressure-operated and hand-controlled device. An excellent example of such a device is an electric iron 11, and for purposes of illustration only, I am herein describing my invention in conjunction with an electric iron 11. It is to be understood however, that my invention is equally applicable for use in conjunction with any device which depends for its satisfactory operation, upon pressure components in two directions, one of which is translated into motion. Thus, in the case of an electric iron, there is a downward component in the direction indicated at 12 and a forward component translated into motion, in the direction indicated at 13.

While the hand 14 which operates the handle 10, is capable of transmitting the forces requisite for imparting the components 12 and 13, it is not possible to construct a rigid handle which is so shaped as to permit the hand 14 to transmit its forces over large areas of every handle. Yet, a non-rigid handle would not be capable of transmitting such forces, for they would be dissipated in the independent movements of the non-rigid handle. On the other hand, the transmission of pressure-operating forces through the few parts of the hand which come in contact with a rigid handle, imposes tiring and ofttimes painful stresses on such parts, and frequently causes calluses to be formed. It has been found that a yieldable substance, such as sponge rubber, foam rubber, or the like, may be helpful in cushioning the unpleasant effects of this operation. However, sponge rubber pads hitherto designed, have not been efficient in operation, in that they merely radially cushioned, but did not themselves operate efficiently to transmit the forces requisite for proper operation of the iron. As a result, extra forces were required to be exerted by the operator, to squeeze the padded handle in order to overcome the resilience and yieldability of the pad so as to obtain a firm grip thereon, in addition to the pressure and movement-controlling forces needed to operate the device to which the handle is attached.

In a preferred embodiment of my invention, the handle 10 comprises a heel portion 15 and a toe portion 16 adapted to be mounted in any suitable manner on the electric iron 11, and along the longitudinal axis thereof. The heel 15 comprises a pressure-transmitting area 17 adapted to bear against an upper, rearward portion 18 of the iron 11. The toe portion 16 comprises a force-transmitting area 19 adapted to bear against an upper forward portion 20 of the iron 11. A rigid beam member 21 extends between the heel 15 and toe 16 and is fixedly secured thereto, and preferably formed integrally therewith. The beam member 21 comprises an upper cradle portion 22 which in one preferred form consists of a bed portion consisting of a substantially flat area 23 inclined upwardly and forwardly approximately 15° with respect to the horizontal, and intercepting at its forward end with a plane 24 disposed at a substantially 135° angle with said bed area 23. A substantially similar plane 25 intercepts the rearward end of the area 23, at substantially 45° thereto. The sides and bottom of the rigid beam 21 are shaped so as to form an upper, forward, finger-receiving portion 26, an upper, rearward, finger-receiving portion 27, and a finger-grasp portion 28.

A resilient pad 29 of substantial yieldability, such as sponge rubber, foam rubber, or other soft, substantially resilient material is provided, having a lower configuration substantially identical to the configuration of the cradle 22, and comprising a bottom, pressure-transmitting area 30, a forward inclined plane 31, and a rearward inclined plane 32. The inclined planes 31 and 32 extend upwardly a distance greater than the respective lengths of the inclined planes 24 and 25, and preferably terminate in respective rounded portions 33 and 34 which lead to an upper, pressure-receiving area 35. The pad 29 is inserted in the cradle 22 and caused to adhere thereto by any suitable adhesive 36, such for instance as rubber cement, or the like.

In operation, the hand 14 grasps the handle 10 by embracing the pad 29 and beam 21, with the palm and heel of the hand lying on the soft, pressure-receiving area 35, and the fingers embracing the substantially rigid grasp portion 28 in such a manner that the forefinger rests substantially in proximity to the substantially rigid finger-receiving portion 26, and the little finger rests substantially toward the substantially rigid finger-receiving portion 27. Thus, the pressure transmitting portions of the hand lie against the soft, resilient pad 29, while the movement-controlling portions of the hand, comprising the fingers and thumb, lie against the rigid sides and bottom of the rigid beam 21. When it is desired to use the iron 11, the hand 14 bears downwardly and forwardly against the pad 29, which itself transmits the downward and forward forces to the pressure-receiving area 23 and the force-receiving inclined plane 24. Pressured movement is thus imparted to the iron along the smooth, plane bottom 37 thereof, while the direction of movement is controlled by the fingers and thumb bearing against the rigid sides and bottom of the beam 21. While pressure and force are thus imparted through the resilient pad 29, they do not impose lateral or longitudinal strains on the adhesive 36. Instead, the forces transmitted through or on the adhesive are substantially perpendicular to the juncture, thereby tending further to strengthen rather than to destroy said adhesive juncture.

It will thus be found that I have provided a handle whereby pressure may be transmitted through a soft, resilient pad, while movement is controlled by rigid and non-resilient devices; all while said pressure is transmitted to rigid portions of said handle in such a manner as not to destroy or otherwise to harm the adhesive junction therebetween.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention what I claim as new and desire to obtain by Letters Patent, is:

1. A handle member for imparting to a device, pressure in one direction, and motion in another direction; said handle member comprising a beam portion; a cradle formed in said beam portion and comprising a bed portion having an area substantially perpendicular to the direction of said pressure, and an inclined portion substantially intercepting said bed portion, said inclined portion being substantially perpendicular to the direction of application of movement-imparting pressure; a resilient pad of substantial yieldability, disposed in said cradle and adhesively secured to said bed portion and said inclined portion, said pad projecting beyond an outer limit of said inclined portion; and said cradle portion also comprising rigid, movement-control portions disposed in apposition to the location of a portion of a hand when said hand grasps said handle in pressure-imparting and movement-imparting operation.

2. A handle member for imparting to a device, pressure in one direction and motion in another direction; said handle member comprising a beam portion; a cradle formed in said beam portion and comprising a bed portion having a substantially flat area disposed at substantially 15° to the horizontal, and an inclined portion comprising an area substantially intercepting said bed portion at substantially 135° to the area of said bed portion, and another inclined portion comprising an area substantially intercepting said bed portion and disposed at substantially 45° with respect thereto; a resilient pad of substantial yieldability disposed in said cradle and adhesively secured to the area of said bed portion and said inclined portions, said pad projecting upwardly beyond the upper limits of said inclined portions.

3. A handle member for imparting to a device, pressure in one direction and motion in another direction; said handle member comprising a beam portion; a cradle formed in said beam portion and comprising a bed portion having a substantially flat area disposed at substantially 15° to the horizontal, and an inclined portion comprising an area substantially intercepting said bed portion at substantially 135° to the area of said bed portion, and another inclined portion comprising an area substantially intercepting said bed portion and disposed at substantially 45° with respect thereto; a resilient pad of substantial yieldability disposed in said cradle and adhesively secured to the area of said bed portion and said inclined portions, said pad projecting upwardly beyond the upper limits of said inclined portions; and said beam portion also comprising a substantially rigid, finger-grasp portion disposed beneath said cradle.

4. A handle member for imparting to a device, pressure in one direction and motion in another direction; said handle member comprising a beam portion; a cradle formed in said beam portion and comprising a bed portion having a substantially flat area disposed at substantially 15° to the horizontal, and an inclined portion comprising an area substantially intercepting said bed portion at substantially 135° to the area of said bed portion, and another inclined portion comprising an area substantially intercepting said bed portion and disposed at substantially 45° with respect thereto; a resilient pad of substantial yieldability disposed in said cradle and adhesively secured to the area of said bed portion and said inclined portions.

5. A handle member for imparting to a device, pressure in one direction and motion in another direction; said handle member comprising a beam portion; a cradle formed in said beam portion and comprising a bed portion having a substantially flat area disposed at substantially 15° to the horizontal, and an inclined portion comprising an area substantially intercepting said bed portion at substantially 135° to the area of said bed portion, and another inclined portion comprising an area substantially intercepting said bed portion and disposed at substantially 45° with respect thereto; a resilient pad of substantial yieldability disposed in said cradle and adhesively secured to the area of said bed portion and said inclined portions; and said beam portion also comprising a substantially rigid, finger-grasp portion disposed beneath said cradle.

6. A handle member for an electric iron, comprising a toe portion, a heel portion, and a beam intermediate said toe and heel portions and supported thereby, said toe and heel portions adapted to be secured to, and to bear against, the body of said electric iron; said beam portion consisting of a heat-insulating material and comprising a cradle having a bed portion and an inclined portion upwardly projecting from said bed portion; a resilient pad of substantial yieldability, disposed in said cradle, and adhesively secured to said bed portion and to said inclined portion, portions of said pad projecting outwardly from said bed portion and inclined portion, and beyond portions of said beam immediately adjacent said cradle; said beam also comprising a substantially rigid finger-grasp portion disposed beneath said cradle.

7. A handle member for an electric iron, comprising a toe portion, a heel portion, and a beam intermediate said toe and heel portions and supported thereby, said toe and heel portions adapted to be secured to, and to bear against, the body of said electric iron; said beam portion consisting of a heat-insulating material and comprising a cradle having a bed portion and an inclined portion upwardly projecting from said bed portion; a resilient pad of substantial yieldability, disposed in said cradle, and adhesively secured to said bed portion and to said inclined portion, portions of said pad projecting outwardly from said bed portion and inclined portion, and beyond portions of said beam immediately adjacent said cradle.

MARGARET RICKETTSON.

References Cited in the file of this patent

UNITED STATES PATENTS

| Number | Name | Date |
|---|---|---|
| 1,008,604 | Lake | Nov. 14, 1911 |
| 1,977,626 | Finkelstein | Oct. 23, 1934 |
| 2,140,157 | Huffman | Dec. 13, 1938 |
| 2,144,474 | Woodman | Jan. 17, 1939 |